United States Patent

(12) United States Patent
Suzuki et al.

(10) Patent No.: US 8,123,654 B2
(45) Date of Patent: Feb. 28, 2012

(54) HYBRID DRIVING APPARATUS, VEHICLE WITH THE SAME AND CONTROL METHOD OF THE SAME

(75) Inventors: Yoshitaka Suzuki, Nishikamo-gun (JP); Keiichi Murata, Tahara (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 411 days.

(21) Appl. No.: 12/521,993

(22) PCT Filed: Dec. 27, 2007

(86) PCT No.: PCT/JP2007/075420
§ 371 (c)(1),
(2), (4) Date: Jul. 2, 2009

(87) PCT Pub. No.: WO2008/084754
PCT Pub. Date: Jul. 17, 2008

(65) Prior Publication Data
US 2010/0101880 A1 Apr. 29, 2010

(30) Foreign Application Priority Data

Jan. 10, 2007 (JP) .................................. 2007-002548

(51) Int. Cl.
*B60K 1/02* (2006.01)
*B60W 20/00* (2006.01)
(52) U.S. Cl. ....................... 477/3; 180/65.265
(58) Field of Classification Search ............. 180/65.265, 180/65.275, 65.21, 65.285, 65.29; 903/930, 903/940, 942, 943, 945; 477/3, 15, 34; 701/51
See application file for complete search history.

(56) References Cited

U.S. PATENT DOCUMENTS

| | | | | |
|---|---|---|---|---|
| 6,428,444 B1 * | 8/2002 | Tabata | ............................... | 477/3 |
| 6,867,509 B1 * | 3/2005 | Takaoka et al. | ............. | 290/40 A |
| 6,907,337 B2 * | 6/2005 | Phillips et al. | .................. | 701/51 |
| 6,966,867 B2 * | 11/2005 | Tajima et al. | ...................... | 477/7 |
| 7,090,612 B2 * | 8/2006 | Ozeki et al. | ........................ | 477/3 |
| 7,131,933 B2 * | 11/2006 | Tabata | ........................ | 477/181 |
| 7,261,670 B2 * | 8/2007 | Endo et al. | ........................ | 477/3 |
| 7,261,671 B2 * | 8/2007 | Ortmann et al. | .................. | 477/6 |
| 7,331,899 B2 * | 2/2008 | Ortmann et al. | .................. | 477/6 |
| 7,552,003 B2 * | 6/2009 | Suzuki et al. | ................... | 701/51 |
| 7,601,093 B2 * | 10/2009 | Tabata et al. | ...................... | 477/5 |

(Continued)

FOREIGN PATENT DOCUMENTS

JP 06-319210 A 11/1994

(Continued)

*Primary Examiner* — J. Allen Shriver, II
*Assistant Examiner* — Jacob Meyer
(74) *Attorney, Agent, or Firm* — Sughrue Mion, PLLC

(57) ABSTRACT

For raising an MG2 rotational speed MRN2 to a target rotational speed (low-gear rotational speed NLG), an output torque of an MG2 starts to increase at a time t4. During an inertia phase (period α), the output torque of the MG2 is limited not to exceed a first limit value TLIM1 determined according to a shift progress degree PRG and a second limit value TLIM2 determined according to a rotational speed margin NEmgn. Since the output torque of the MG2 is sufficiently small in a final stage of the inertia phase (period α), output variations occurring at a time t6 when torque down is performed on the MG2 can be small. The torque down of the MG1 and MG2 does not raise engine rotational speed NE.

8 Claims, 8 Drawing Sheets

U.S. PATENT DOCUMENTS

| | | | | |
|---|---|---|---|---|
| 7,694,763 B2 * | 4/2010 | Sugai et al. | | 180/65.26 |
| 7,824,307 B2 * | 11/2010 | Matsubara et al. | | 477/5 |
| 7,955,215 B2 * | 6/2011 | Shibata | | 477/3 |
| 2001/0020789 A1 * | 9/2001 | Nakashima | | 290/40 C |
| 2002/0105188 A1 * | 8/2002 | Tomikawa | | 290/40 C |
| 2004/0044458 A1 * | 3/2004 | Kadota | | 701/55 |
| 2004/0127326 A1 * | 7/2004 | Tajima et al. | | 477/3 |
| 2004/0192494 A1 * | 9/2004 | Ozeki et al. | | 477/3 |
| 2005/0029023 A1 * | 2/2005 | Takami et al. | | 180/65.3 |
| 2005/0054479 A1 * | 3/2005 | Masterson et al. | | 477/3 |
| 2005/0054480 A1 * | 3/2005 | Ortmann et al. | | 477/6 |
| 2005/0060079 A1 * | 3/2005 | Phillips et al. | | 701/53 |
| 2005/0203678 A1 * | 9/2005 | Suzuki et al. | | 701/22 |
| 2005/0288147 A1 * | 12/2005 | Endo et al. | | 477/5 |
| 2006/0108163 A1 * | 5/2006 | Kitano et al. | | 180/65.2 |
| 2007/0240922 A1 * | 10/2007 | Kikuchi | | 180/65.4 |
| 2007/0270277 A1 * | 11/2007 | Ortmann et al. | | 477/5 |
| 2008/0318727 A1 * | 12/2008 | Matsubara et al. | | 477/3 |
| 2009/0069147 A1 * | 3/2009 | Tabata et al. | | 477/3 |
| 2009/0151491 A1 * | 6/2009 | Tabata et al. | | 74/335 |
| 2009/0156359 A1 * | 6/2009 | Tabata et al. | | 477/108 |
| 2009/0294194 A1 * | 12/2009 | Kitano et al. | | 180/65.265 |
| 2009/0314565 A1 * | 12/2009 | Suzuki | | 180/65.285 |
| 2010/0093486 A1 * | 4/2010 | Suzuki et al. | | 477/3 |

FOREIGN PATENT DOCUMENTS

| | | |
|---|---|---|
| JP | 2004-203218 A | 7/2004 |
| JP | 2004-203219 A | 7/2004 |
| JP | 2004-204957 A | 7/2004 |
| JP | 2004-204960 A | 7/2004 |
| JP | 2004-217096 A | 8/2004 |
| JP | 2005-039923 A | 2/2005 |
| JP | 2005-348585 A | 12/2005 |
| JP | 2006-182272 A | 7/2006 |
| JP | 2006-315485 A | 11/2006 |
| WO | 2004/058530 A2 | 7/2004 |

* cited by examiner

FIG.2
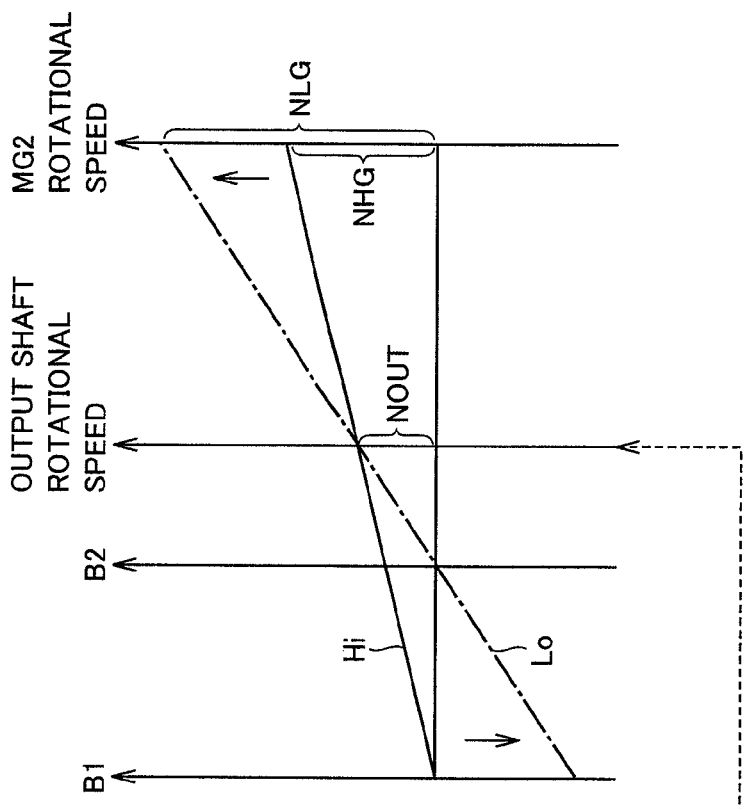
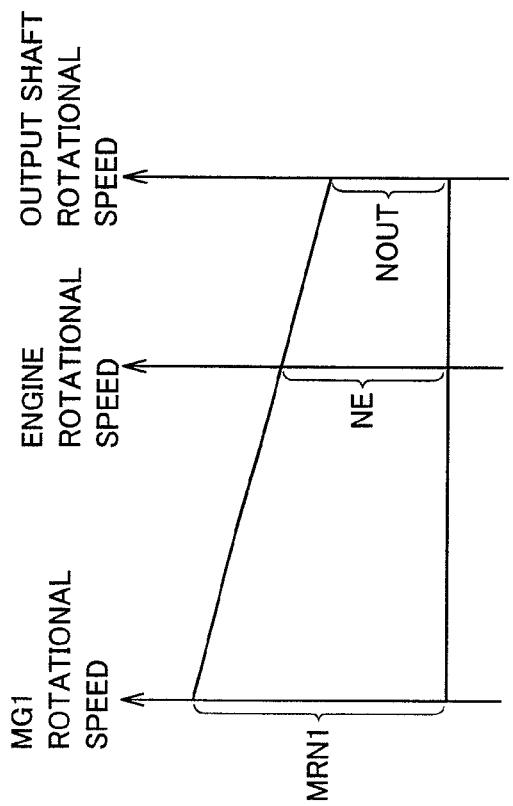

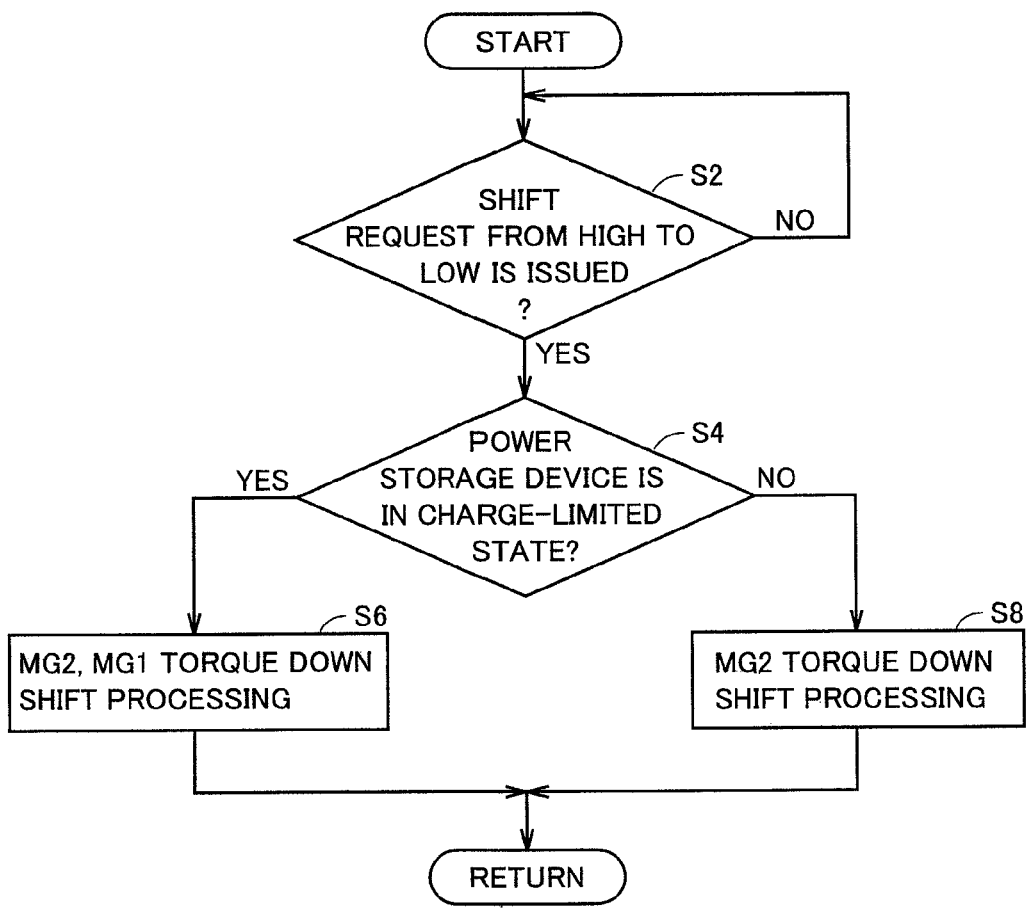

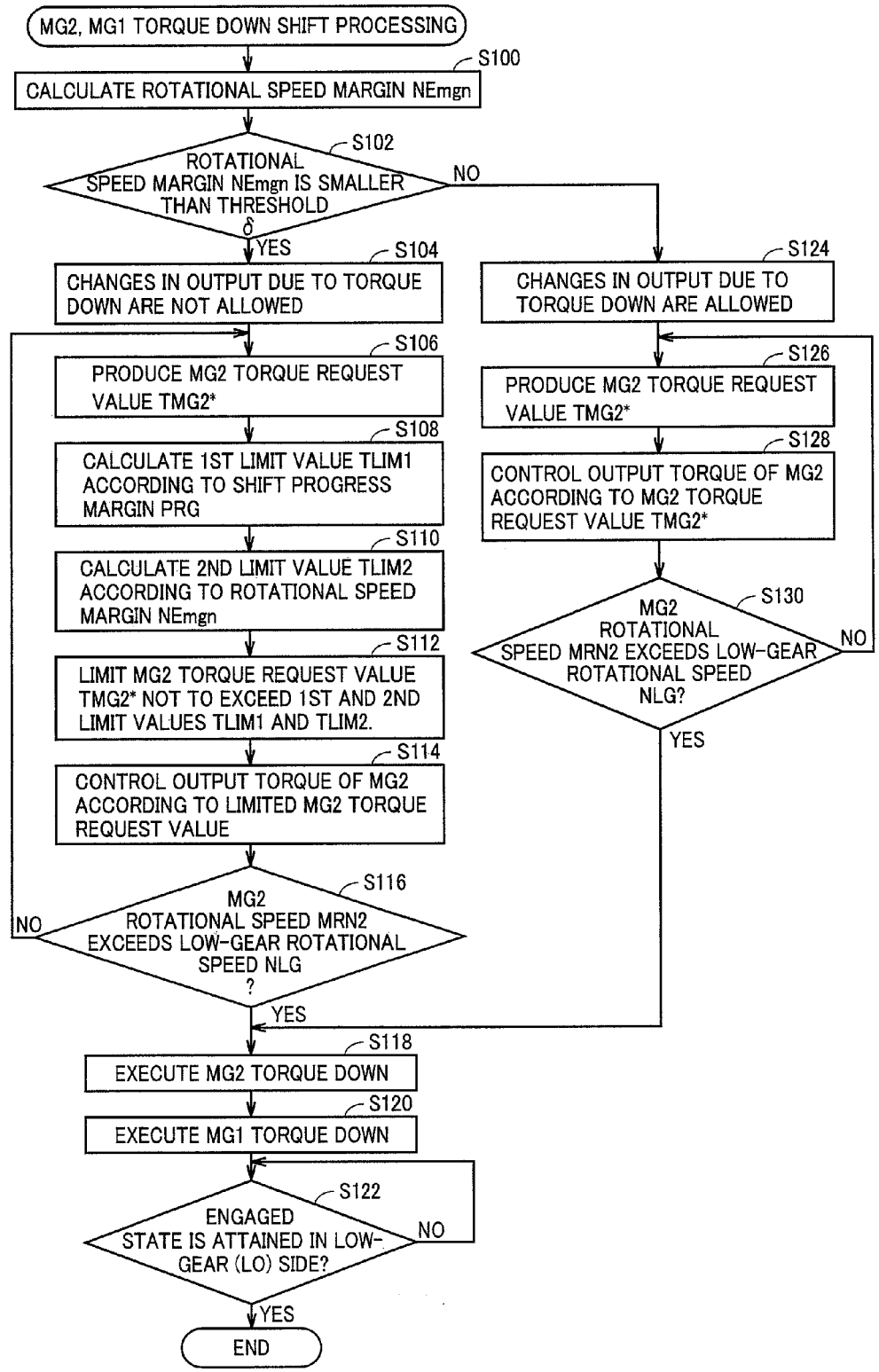

HYBRID DRIVING APPARATUS, VEHICLE WITH THE SAME AND CONTROL METHOD OF THE SAME

CROSS REFERENCE TO RELATED APPLICATION

This application is a National Stage of International Application No. PCT/JP2007/075420 filed Dec. 27, 2007, claiming priority based on Japanese Patent Application No. 2007-002548, filed Jan. 10, 2007, the contents of all of which are incorporated herein by reference in their entirety.

TECHNICAL FIELD

The invention relates to a hybrid driving apparatus provided with a power source and an electric motor, a vehicle with the same and a control method of the same, and particularly to a structure in which the electric motor is mechanically connected to a rotation output shaft via a transmission mechanism capable of selecting a plurality of gear ratios.

BACKGROUND ART

Japanese Patent Laying-Open No. 2004-203219 has disclosed a hybrid driving apparatus in which an electric motor allowing control of a rotational speed is connected to an output member receiving a torque supplied from a main power source via a transmission mechanism performing shifting by changing an engagement device between engaged and released states.

This hybrid driving apparatus controls the electric motor to attain a specific target rotational speed during power-off shifting so that a shifting delay and/or a shifting shock may be prevented at the time of power-off shifting.

Japanese Patent Laying-Open No. 06-319210 has disclosed another hybrid driving apparatus that can prevent a shock at the time of shifting by executing torque down of an electric motor when a torque is being transmitted from a rotation output shaft to the electric motor during shifting.

Further, it can be expected that the shift shock can be prevented in a wider range of the drive state when the technology disclosed in Japanese Patent Laying-Open No. 06-319210 for preventing the shift shock due to the torque down of the electric motor is applied to the hybrid driving apparatus of Japanese Patent Laying-Open No. 2004-203219.

In some cases, charging is limited in a power storage device connected electrically to a power generator. More specifically, when the power storage device is in a state of charge of a rated value or more, the charging is limited for protecting the power storage device from overcharge.

As described above, when the torque down of the electric motor is executed in the hybrid driving apparatus that disclosed in Japanese Patent Laying-Open No. 2004-203219 and further employing the technology of Japanese Patent Laying-Open No. 06-319210, power consumption of the electric motor decreases so that a surplus power in the power generated by the power generator increases. When the charging of the power storage device is limited in this case, it is necessary to avoid the increase in quantity of the power generated by the power generator for protecting the power storage device. Accordingly, it may be envisaged to employ a manner that executes the torque down of the power generator along with the torque down of the electric motor for keeping a power balance in the hybrid driving apparatus.

However, output control of a main power source (e.g., an engine) is performed relatively slowly as compared with torque down control of the electric motor and power generator so that a power balance is lost in the hybrid driving apparatus. This results in rising of the rotational speed of the main power source.

Usually, an allowed upper limit rotational speed is determined in the engine, and the rotational speed must be kept at or below the allowed upper limit rotational speed. Therefore, it is considered that the foregoing torque down of the electric motor and power generator may raise the rotational speed of the main power source, i.e., the engine to exceed the allowed upper limit rotational speed.

As described above, it is difficult to achieve simultaneously two mutually contradictory objects, to avoid the shift shock due to execution of the torque down of the electric motor and power generator and to keep the main power source at or below the allowed upper limit rotational speed. In this case, it can be considered that the latter is achieved on a priority basis for preventing damages of the main power source, resulting in a problem that the shift shock cannot be avoided.

DISCLOSURE OF THE INVENTION

The invention has been made for overcoming the above problem, and an object of the invention is to provide a hybrid driving apparatus provided with a drive source and an electric motor, and particularly a hybrid driving apparatus that can reliably avoid a shift shock in the shift operation from a currently selected gear ratio to a larger gear ratio. Another object of the invention is to provide a vehicle provided with the hybrid driving apparatus as well as a control method thereof.

A hybrid driving apparatus according to an aspect of the invention includes a power generator electrically connected to a power storage device; an output distribution mechanism for distributing a part of an output of a power source to the power generator and for distributing the remainder of the output to a rotation output shaft; a transmission mechanism for selectively providing a plurality of gear ratios by a combination of engaging and releasing of a plurality of frictional engagement devices; an electric motor electrically connected to the power storage device and mechanically connected to the rotation output shaft via the transmission mechanism; an electric motor control unit for controlling an output of the electric motor; a power generator control unit for restraining increase in quantity of the power generated by the power generator according to execution of a second control operation by the electric motor control unit during limitation of charging of the power storage device; a determination unit for determining whether or not changes in output of the electric motor caused by operation switching from a first control operation to the second control operation is allowed, during limitation of charging of the power storage device and prior to the electric motor control unit executes the second control operation; and a limiting unit for limiting the torque of the electric motor in the first control operation to be smaller than that attained when the changes in output are allowed in the first control operation, if the determination unit determines that the changes in output are not allowed. The electric motor control unit executes, in a shift operation of changing a first gear ratio to a second gear ratio larger than the first gear ratio, the first control operation for controlling a torque of the electric motor to raise a rotational speed of the electric motor to a target value corresponding to the second gear ratio, and the second control operation subsequent to the first control operation for reducing the torque of the electric motor to or below a predetermined value.

According to the invention, when it is necessary to inhibit variations that may occur in output of the electric motor due to operation switching (execution of torque down) from the first control operation to the second operation, i.e. when the power source (e.g. engine) is operating in a range near an allowed upper limit rotational speed, the torque of the electric motor is limited in advance during the period of the first control operation. Thereby, it is possible to retrain rising of the rotational speed of the power source when the operation is switched from the first control operation to the second operation control. Further, even when the torque is limited, the second control operation is performed executed after the rotational speed of the electric motor rises to the target value corresponding to the second gear ratio. Therefore, the output at the time of engaging is reduced, and the shift shock can be avoided Accordingly, even when the charging of the power storage device is being limited and the power source is operating in a range near the allowed upper limit rotational speed, the shift shock can be reliably avoided.

Preferably, the determination unit determines that the changes in output of the electric motor is not allowed, if a rotational speed margin with respect to an allowed upper limit rotational speed of the power source is smaller than a predetermined value.

Preferably, the limiting unit reduces the torque of the electric motor according to progress of the first control operation.

Preferably, the limiting unit determines a first limit value according to a degree attaining of a present rotational speed of the electric motor with respect to the rotational speed corresponding to the second gear ratio, and limits the torque of the electric motor not to exceed the first limit value.

Preferably, the limiting unit limits the output of the electric motor not to exceed a second limit value determined depending on the rotational speed margin with respect to the allowed upper limit rotational speed of the power source.

According to another aspect of the invention, a vehicle includes one of the foregoing hybrid driving apparatuses.

According to a control method of a hybrid driving apparatus of still another aspect of the invention, the hybrid driving apparatus includes a power generator electrically connected to a power storage device; an output distribution mechanism for distributing a part of an output of a power source to the power generator and for distributing the remainder of the output to a rotation output shaft; a transmission mechanism for selectively providing a plurality of gear ratios by a combination of engaging and releasing of a plurality of frictional engagement devices; and an electric motor electrically connected to the power storage device and mechanically connected to the rotation output shaft via the transmission mechanism. The control method according to this aspect includes a first control step of controlling a torque of the electric motor to raise a rotational speed of the electric motor to a target value corresponding to the second gear ratio in a shift operation of changing a first gear ratio to a second gear ratio larger than the first gear ratio; a second control step of reducing the torque of the electric motor to or below a predetermined value, subsequently to the first control operation; and a third control step of restraining increase in quantity of the power generated by the power generator according to execution of the second control step during limitation of charging of the power storage device. Further, the first control step includes a step of determining whether or not changes in output of the electric motor caused by execution processing from the first control step to the second control step is allowed, during limitation of charging of the power storage device, and a step of limiting the torque of the electric motor to be smaller than that attained when the changes in output are allowed, if it is determined in the determination step that the changes in output are not allowed.

The invention can achieve the hybrid driving apparatus provided with the power source and the electric motor, and particularly the hybrid driving apparatus that can reliably avoid the shift shock in the shift operation from a currently selected gear ratio to a larger gear ratio. Also, the invention can achieve the vehicle provided with the above hybrid driving apparatus as well as the control method thereof.

BRIEF DESCRIPTION OF THE DRAWINGS

FIG. 2 shows alignment charts between an engine and first and second motor generators.

FIG. 7 is a flowchart showing processing procedures relating to the shift operation according to the embodiment of the invention.

FIG. 8 is a flowchart showing details of MG2 and MG1 torque down shift processing.

BEST MODES FOR CARRYING OUT THE INVENTION

Embodiments of the invention will now be described with reference to the drawings. In the following description, the same or corresponding portions bear the same reference numbers, and description thereof is not repeated.

(Structure of Hybrid Driving Apparatus)

Figure 1:
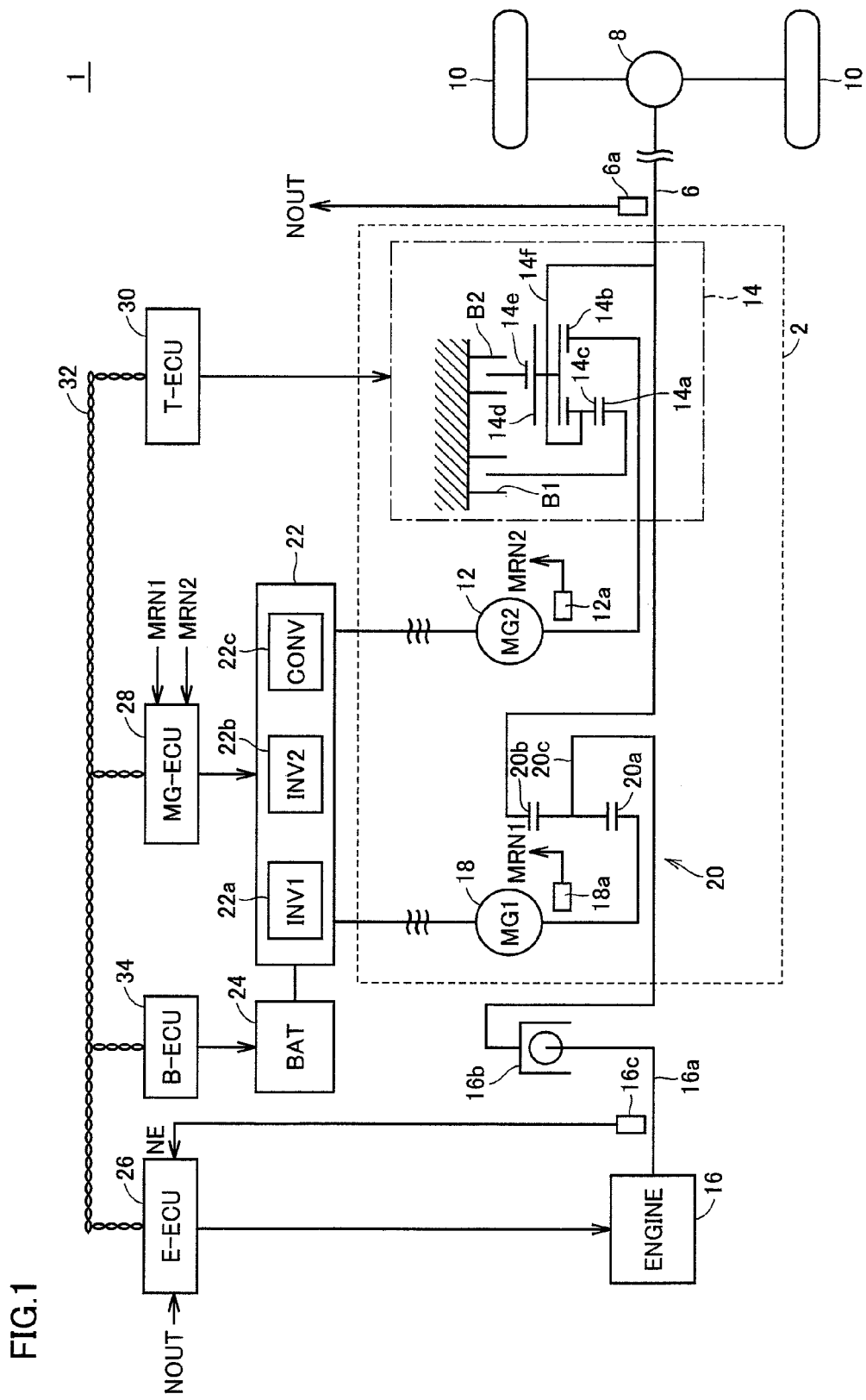
FIG. 1 shows a schematic structure of a hybrid driving apparatus according to an embodiment of the invention.

FIG. 1 shows a schematic structure of a hybrid driving apparatus 1 according to an embodiment of the invention.

Referring to FIG. 1, hybrid driving apparatus 1 according to the embodiment of the invention includes an engine 16 corresponding to a "power source", a transaxle 2, a rotation output shaft 6, a differential gear 8 and drive wheels 10.

The output torque of engine 16 is transmitted to rotation output shaft 6 via transaxle 2, and is further transmitted therefrom to drive wheels 10 via differential gear 8. Transaxle 2 can operate to generate an electric power by receiving a part of an output torque of engine 16, and also to perform selectively power running control for adding a drive power for running to rotation output shaft 6 or regeneration control for collecting energy.

Engine 16 is a known power device such as a gasoline engine or a diesel engine that outputs the power by burning fuel, and is configured to allow electric control of drive states such as an opening position of throttle (intake quantity), a fuel supply quantity and ignition timing. This control is performed, e.g., by an electronic control unit (E-ECU) 26 for engine 16 having a microcomputer as a major component.

Transaxle 2 is primarily formed of a planetary gear mechanism 20 corresponding to an "output distribution mechanism", a first motor generator 18 corresponding to a "power generator", a second motor generator 12 corresponding to an "electric motor" and a transmission mechanism 14. Second motor generator 12 is mechanically connected to rotation output shaft 6 via transmission mechanism 14. Thereby, a torque transmitted between second motor generator 12 and rotation output shaft 6 can be changed according to a gear ratio set by transmission mechanism 14.

Planetary gear mechanism 20 combines or distributes the torques of or for engine 16, first motor generator 18 and rotation output shaft 6. More specifically, planetary gear mechanism 20 is a known gear mechanism that performs a differential operation using three rotation elements, i.e., a sun gear 20a that is an external tooth gear, a ring gear 20b that is an internal tooth gear arranged coaxially with sun gear 20a and a carrier 20c holding a pinion gear meshing with sun gear 20a and ring gear 20b for rotation around its own axis and revolution around sun gear 20a. An output shaft (i.e., crankshaft in this embodiment) of engine 16 is coupled to carrier 20c via a damper 16b. Thus, carrier 20c is an input element of planetary gear mechanism 20.

First motor generator 18 is connected to sun gear 20a. Therefore, sun gear 20a is a so-called reaction element, and ring gear 20b is an output element. Ring gear 20b is coupled as an output member to rotation output shaft 6.

E-ECU 26 detects a rotation state of an output shaft 16a (engine rotational speed NE) by a rotational speed sensor 16c, and also detects a rotation state of rotation output shaft 6 (output shaft rotational speed NOUT) by a rotational speed sensor 6a.

First motor generator 18 (which may also be referred to as an "MG1" hereinafter) is formed of, e.g., a synchronous electric motor, has both a function as the electric motor and a function as the electric power generator, and is electrically connected to a power storage device (BAT) 24 such as a battery via a power control unit 22. A first inverter (INV1) 22a of power control unit 22 can be controlled to govern appropriately the output torque of first motor generator 18 (power running torque or regenerative torque). For this setting, the device employs an electronic control unit (MG-ECU) 28 primarily formed of a microcomputer for controlling the motor generators.

In this embodiment, a setting for generating a regenerative torque is provided to first motor generator 18 so that first motor generator 18 operates as an electric power generator. MG-ECU 28 detects a rotation state of first motor generator 18 (an MG1 rotational speed MRN1) by a rotational speed sensor 18a.

Second motor generator (which may also be referred to as an "MG2" hereinafter) 12 is likewise formed of a synchronous electric motor, and has both a function as an electric motor and a function as a power generator. MG-ECU 28 controls a second inverter (INV2) 22b of power control unit 22 to select the power running operation for outputting the torque and the regenerative operation for collecting energy and to set appropriately the output torques in the respective operations. MG-ECU 28 detects the rotation state of second motor generator 12 (an MG2 rotational speed MRN2) by a rotational speed sensor 12a.

In addition to inverters 22a and 22b, power control unit 22 further includes a boost converter (CONV) 22c for boosting the power supplied from power storage device 24 and supplying the results to inverters 22a and 22b. MG-ECU 28 also controls this boost converter 22c.

An electronic control unit (B-ECU) 34 primarily formed of a microcomputer is employed for managing the state of charge of power storage device 24. B-ECU 34 calculates the SOC (State Of Charge) of power storage device 24 by a known method based on a charge/discharge current, voltage, temperature and the like of power storage device 24. Further, B-ECU 34 determines an allowed charge power Win, i.e., a maximum value of the power with which power storage device 24 can be charged, and an allowed discharge power Wout, i.e., a maximum value of the power that can be discharged from power storage device 24. This determination is performed based on the calculated SOC with reference to a predetermined characteristic map.

Transmission mechanism 14 can selectively form a plurality of gear ratios (e.g., a low gear Lo and a high gear Hi) by a combination of engagement and release of a plurality of frictional engagement devices. This transmission mechanism 14 can be appropriately designed to form low gear Lo of a gear ratio larger than "1". When second motor generator 12 performs the power running to output the torque, the above configuration can increase the output torque of second motor generator 12 for transmitting it to rotation output shaft 6. Therefore, the capacity and/or sizes of second motor generator 12 can be reduced.

Further, it is preferable that second motor generator 12 keeps its drive efficiency in a good state. Therefore, when the rotational speed of rotation output shaft 6 increases, e.g., according to a vehicle speed, high gear Hi of a smaller gear ratio is selected to lower the rotational speed of second motor generator 12. Further, when the rotational speed of rotation output shaft 6 lowers, low gear Lo may be selected again.

The "gear ratio" in the description is a value obtained by dividing the rotational speed transmitted from second motor generator 12 to transmission mechanism 14 by the corresponding output rotational speed transmitted from transmission mechanism 14 to rotation output shaft 6. Thus, when the gear ratio is larger than "1", a power lower in rotational speed and larger in torque than that of second motor generator 12 is transmitted to rotation output shaft 6.

More specifically, transmission mechanism 14 is formed of a set of Ravigneaux type planetary gear mechanisms. More specifically, transmission mechanism 14 is provided with external tooth gears, i.e., first and second sun gears 14a and 14b. First sun gear 14a meshes with a short pinion 14c, which meshes with a long pinion 14d having a larger axial length. Long pinion 14d further meshes with a ring gear 14e arranged coaxially with sun gears 14a and 14b. A carrier 14f carries each of pinions 14c and 14d for rotation on its own axis and revolution. Second sun gear 14b meshes with long pinion 14d. Therefore, first sun gear 14a and ring gear 14e form a mechanism corresponding to a double pinion type planetary gear mechanism together with respective pinions 14c and 14d, and second sun gear 14b and ring gear 14e form a mechanism corresponding to a single pinion type planetary gear mechanism together with long pinion 14d.

There are arranged a first brake B1 selectively fixing first sun gear 14a as well as a second brake B2 selectively fixing ring gear 14e. These brakes B1 and B2 are friction engagement devices producing an engaging force by a frictional force, and may be formed of multiplate type engaging devices or band type engaging devices, respectively. Each of brakes B1 and B2 is typically configured to change continuously its torque capacity according to an engaging force produced by a hydraulic pressure.

Further, second sun gear 14b is coupled to second motor generator 12, and carrier 14f is coupled to rotation output shaft 6. In transmission mechanism 14, therefore, second sun gear 14b is an input element, and carrier 14f is an output element. When first brake B1 is engaged and second brake B2 is released, high gear Hi is set. When first brake B1 is released and second brake B2 is engaged, low gear Lo of a larger gear ratio is set.

The shift operation between the different gears is executed based on running states such as a vehicle speed and a required drive force (or an accelerator press-down degree). More specifically, gear ranges are predetermined as a map (shift diagram), and the control is performed to set one of the gears according to the detected running state. An electronic control unit (T-ECU) 30 for shift control primarily formed of a microcomputer is employed for performing the above control.

Electronic control units 26, 28, 30, and 34 are mutually connected via a communication link 32 for data communications between them, and cooperate with each other to execute the control processing.

FIG. 2 shows alignment charts between engine 26 and first and second motor generators 18 and 12.

FIG. 2(a) shows an alignment chart relating to planetary gear mechanism 20 corresponding to the "output distribution mechanism". Referring to FIGS. 1 and 2(a), when sun gear 20a receives a reaction force torque produced by first motor generator 18 to the output torque of engine 16 applied to carrier 20c, a torque smaller than the torque supplied from engine 16 appears on ring gear 20b forming the output element. Therefore, a part of the output torque of engine 16 is distributed to first motor generator 18, and the remainder is distributed to rotation output shaft 6. First motor generator 18 receiving this distributed torque functions as a power generator.

The rotational speed of first motor generator 18 (MG1 rotational speed MRN1), the rotational speed of engine 16 (engine rotational speed NE) and the rotational speed of ring gear 20b (output shaft rotational speed NOUT) are arranged on a straight line determined according to gear ratios between the elements of planetary gear mechanism 20. Therefore, when the rotational speed of ring gear 20b (NOUT) is constant, the rotational speed of first motor generator 18 (MRN1) can be appropriately changed so that the rotational speed of engine 16 (NE) can be changed continuously, i.e., in a stepless fashion. Thus, by controlling the rotational speed of first motor generator 18, engine 16 can be operated in the most efficient rotational speed range.

FIG. 2(b) shows an alignment chart relating to the Ravigneaux type planetary gear mechanism included in transmission mechanism 14. Referring to FIGS. 1 and 2(b), when second brake B2 is engaged to fix ring gear 14e, low gear Lo is set. When first brake B1 is engaged to fix first sun gear 14a, high gear Hi of a smaller gear ratio than low gear Lo is set.

When low gear Lo is set, the output torque of second motor generator 12 is boosted according to the gear ratio and is added to rotation output shaft 6. Conversely, when high gear Hi is set, the torque supplied from second motor generator 12 is boosted at a smaller increasing rate than low gear Lo, and is added to rotation output shaft 6.

The torque added to rotation output shaft 6 is positive when second motor generator 12 is in the drive state (power running state), and is negative when it is in a driven state (regenerative state).

The rotational speed of second motor generator 12 (MG2 rotational speed MRN2) and the rotational speed of ring gear 20b (output shaft rotational speed NOUT) is arranged on a straight line determined according to gear ratios between the elements forming transmission mechanism 14. Therefore, assuming that the rotational speed of carrier 14f (output shaft rotational speed NOUT) is constant, the rotational speed of second motor generator 12 is equal to a high-gear rotational speed NHG when high gear Hi is set, and will rise to a low-gear rotational speed NLG when low gear Lo is set.

Hybrid driving apparatus 1 shown in FIG. 1 drives engine 16 as efficiently as possible to reduce an amount of emissions and simultaneously to improve fuel consumption. The motor generator can perform energy regeneration, and this also improves the fuel consumption. Therefore, when a large drive power is required, second motor generator 12 operates to add its torque to rotation output shaft 6 while engine 16 is transmitting its output torque to rotation output shaft 6. In this case, when the vehicle speed is low, transmission mechanism 14 is set to low gear Lo to increase the torque thus added. When the vehicle speed increases thereafter, transmission mechanism 14 is set to high gear Hi to lower the rotational speed of second motor generator 12. The purpose of this is to keep the good drive efficiency of second motor generator 12 and thereby to prevent lowering of the fuel consumption.

Conversely, when a braking operation is performed during running at a certain vehicle speed, second motor generator 12 enters the driven state to perform the energy regeneration. When the vehicle speed lowers, the shift operation from high gear Hi to low gear Lo takes place.

(Shift Control Performed when Output Variations Due to Torque Down are Allowed)

Description will now be given on the torque down control in the shift operation from high gear Hi to low gear Lo. First, description is given on the shift control performed when the output variations due to the torque down are allowed in the case where the state of charge (SOC) of power storage device 24 is equal to or higher than the reference value and the charging is limited.

Figure 3:
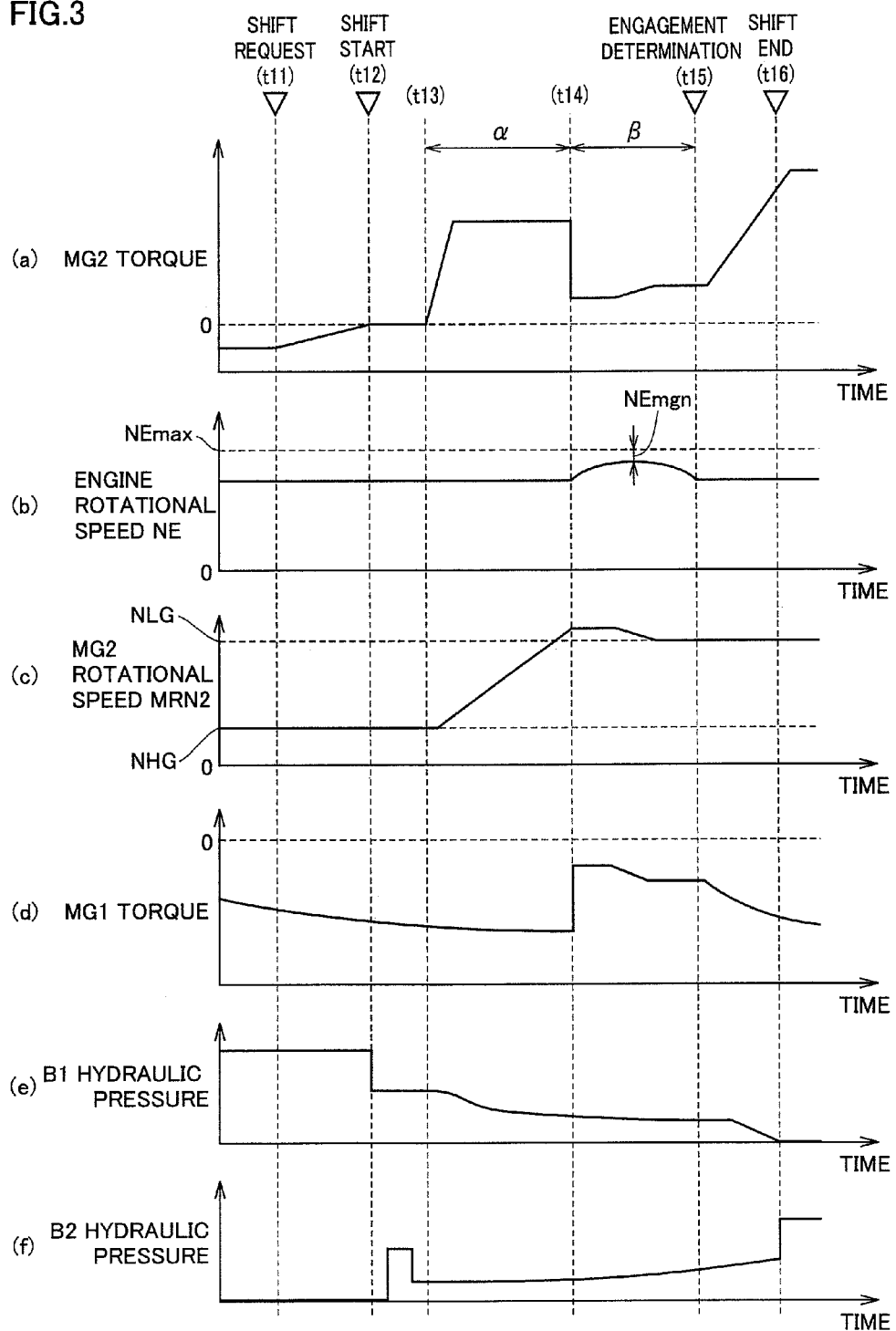
FIG. 3 is a timing chart showing shift control performed when output variations due to torque down are allowed according to the embodiment.

FIG. 3 is a timing chart showing the shift control performed when the output variations due to the torque down are allowed according to the embodiment. FIG. 3(a) shows the output torque of the MG2. FIG. 3(b) shows engine rotational speed NE. FIG. 3(c) shows MG2 rotational speed MRN2. FIG. 3(d) shows an output torque of the MG1. FIG. 3(e) shows a hydraulic pressure (engagement pressure) of first brake B1. FIG. 3(f) is a hydraulic pressure (engagement pressure) of second brake B2.

FIG. 3 shows the case where second motor generator 12 performs the energy regeneration to reduce the vehicle speed, and thereby the shift from high gear Hi to low gear Lo is performed. As shown in FIG. 3(a), therefore, the output torque of second motor generator 12 is negative (the driven state) immediately before the shift from high gear Hi to low gear Lo is requested at a time t11. When the shift request is issued at time t11, the output torque of second motor generator 12 changes from a negative value toward zero. The shift operation starts at a time t12 when the output torque of second motor generator 12 becomes zero. Thereby, the hydraulic pressure of first brake B1 lowers as shown in FIG. 3(e), and the engaging force of first brake B1 decrease. Subsequently to the lowering of the hydraulic pressure of first brake B1, the hydraulic pressure is supplied to second brake B2 in a pulselike fashion as shown in FIG. 3(f) so that the engaging force of first brake B1 is increased.

Subsequently, the output torque of the MG2 starts to increase at a time t13 as shown in FIG. 3(a) for raising MG2 rotational speed MRN2 to the target rotational speed (low-gear rotational speed NLG) corresponding to low gear Lo. According to this increase in output torque of the MG2, MG2 rotational speed MRN2 rises as shown in FIG. 3(c). Torque down is executed on the MG2 at a time t14 when MG2 rotational speed MRN2 exceeds low-gear rotational speed NLG by a predetermined amount. Thus, the output torque of the MG2 lowers to or below a predetermined value. At this time, the torque down is executed on the MG1 for restraining in a surplus power in the power generated by the MG1.

By the torque down of the MG2, MG2 rotational speed MRN2 decreases as shown in FIG. 3(c). In parallel with this, the pressures of brakes B1 and B2 change toward the release side and the engagement side corresponding to the setting of low gear Lo as shown in FIGS. 3(e) and 3(f), respectively. Then, it is determined that the engaged state is attained (time t15) when the transmission path (to be precise, incomplete transmission path) corresponding to low gear Lo is formed from the MG2 to rotation output shaft 6 and MG2 rotational speed MRN2 substantially matches low-gear rotational speed NLG although the transmission pass. Thereby, the output torques of the MG2 and MG1 change toward the values corresponding to the running state of the vehicle as shown in FIGS. 3(a) and 3(d), respectively. Also, brake B1 is completely released, and brake B2 is completely engaged.

Finally, the shift control ends at a time t16, and the control returns to the normal running control. A period α between times t13 and t14 corresponds to the period during which a "first control operation" is executed on the MG2, and a period β between times t14 and t15 corresponds to the period during which a "second control operation" is executed on the MG2. Period α is also referred to as an "inertia phase".

According to the above shift control, the execution of the torque down of the MG1 and MG2 at time t14 causes relatively large output variations, i.e., imbalance (turbulence) in torque occurs in hybrid driving apparatus 1. These variations in output may raise the rotational speed of engine 16. Engine 16 is designed to have an upper limit rotational speed NEmax that is the allowed maximum rotational speed, and engine rotational speed NE must be kept not to exceed this upper limit rotational speed NEmax. Therefore, when engine rotational speed NE does not have a sufficient margin with respect to upper limit rotational speed NEmax, the output variations due to the torque down are not allowed, and the execution of the torque down of the MG2 and MG1 is restricted. Therefore, the shift shock cannot be avoided in some cases.

(Shift Control Performed when Output Variations Due to Torque Down are not Allowed)

Accordingly, even when a rotational speed margin NEmgn with respect to upper limit rotational speed NEmax is small, hybrid driving apparatus 1 according to the embodiment executes the shift control that can reliably avoid the shift shock.

More specifically, while the charging of power storage device 24 is limited, and particularly before the torque down is executed, it is determined whether the output variations due to the torque down of the MG1 and MG2 are allowed or not. When it is determined that the output variations are not allowed, the output torque of the MG2 in the "first control operation" (inertia phase) is limited as compared with the case where the foregoing output variations are allowed.

The about limitation on the output torque can be performed in various manners, the embodiment uses a first limit value TLIM1 determined according to a shift progress degree PRG to be described later and a second limit value TLIM2 determined according to rotational speed margin NEmgn with respect to upper limit rotational speed NEmax. The output torque is limited to exceed neither first limit value TLIM1 nor second limit value TLIM2. For employing limit values TLIM1 and TLIM2 described above, it is determined in this embodiment whether the output variations at the start of the shift operation are allowed or not.

Figure 4:
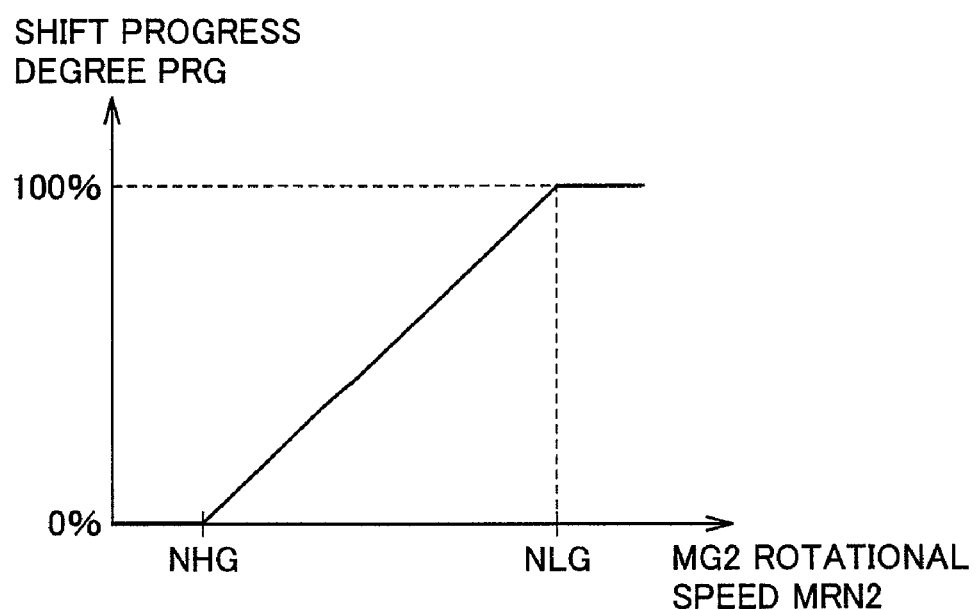
FIG. 4 illustrates a method of calculating a shift progress degree.

FIG. 4 illustrates a method of calculating shift progress degree PRG.

Referring to FIG. 4, the magnitude of MG2 rotational speed MRN2 defines shift progress degree PRG in the shift operation from high gear Hi to low gear Lo. Thus, when MG2 rotational speed MRN2 is equal to high-gear rotational speed NHG, shift progress degree PRG is 0%. When MG2 rotational speed MRN2 is equal to low-gear rotational speed NLG, shift progress degree PRG is 100%.

Thus, shift progress degree PRG indicates a degree of attainment of present MG2 rotational speed MRN2 with respect to the rotational speed corresponding to low gear Lo, and means a degree of completion of the shift process from high gear Hi to low gear Lo.

First control value TLIM1 has characteristics substantially reverse to those of shift progress degree PRG, and is determined to decrease with progress of the shift operation. By using first limit value TLIM1 corresponding to shift progress degree PRG, the limitation on the output torque of the MG2 is relatively relaxed when the operation is in the initial stage of the inertia phase, i.e., when it is necessary to raise MG2 rotational speed MRN2 to a large extent and an appropriate time margin is present before execution of the torque down. Conversely, the limitation on the output torque of the MG2 is relatively enhanced during the latter stage of the inertia phase, i.e., when the necessity to raise MG2 rotational speed MRN2 is small and the torque down will be executed soon.

Second limit value TLIM2 is defined to be substantially proportional to rotational speed margin NEmgn with respect to upper limit rotational speed NEmax.

Figure 5:
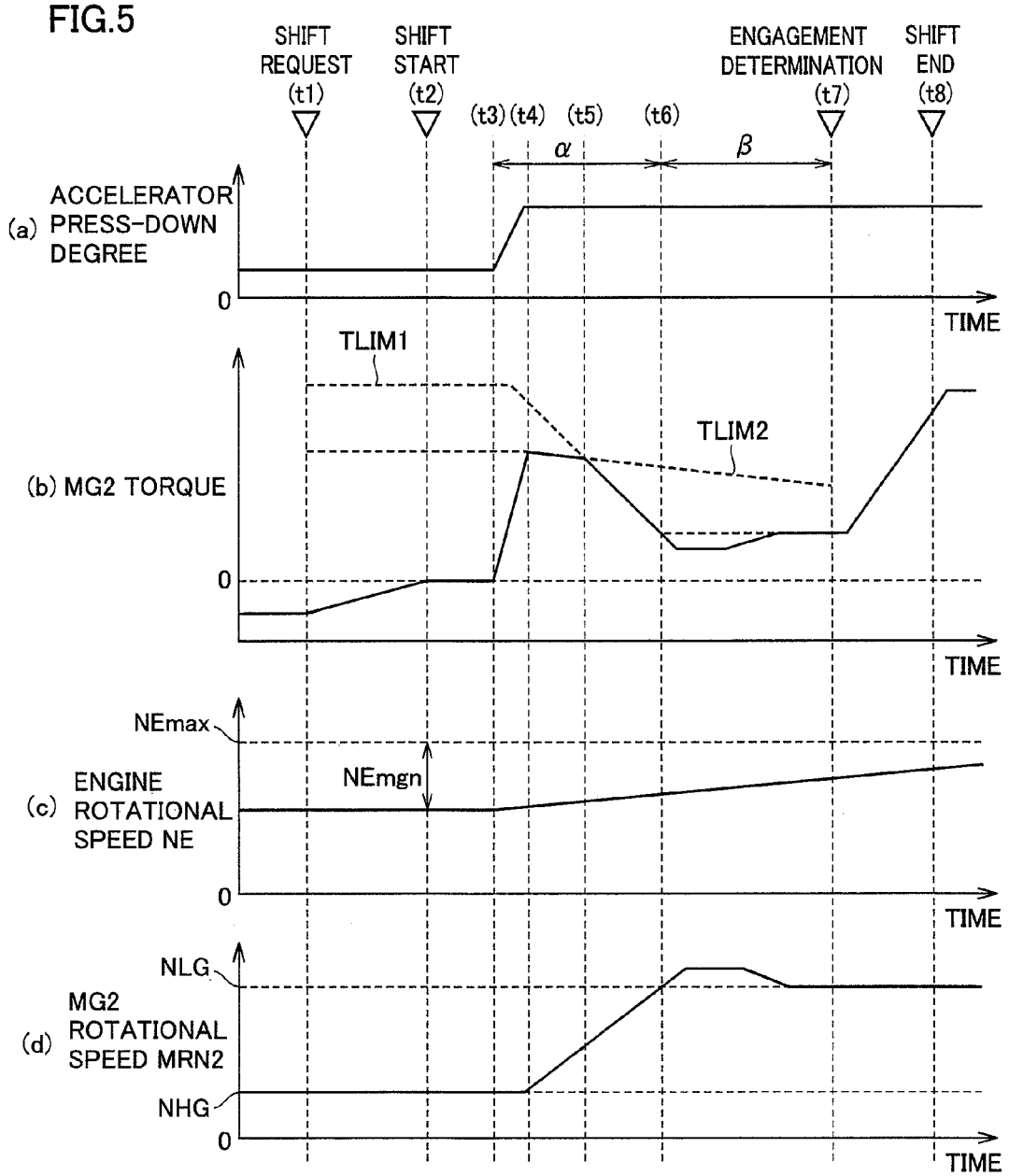
FIG. 5 is a timing chart showing shift control performed when output variations due to torque down are not allowed according to the embodiment.

FIG. 5 is a timing chart showing the shift control performed when the output variations due to torque down are not allowed according to the embodiment. FIG. 5(a) shows the accelerator press-down degree. FIG. 5(b) shows the output torque of the MG2. FIG. 5(c) shows engine rotational speed NE. FIG. 5(d) shows MG2 rotational speed MRN2.

Similarly to FIG. 3, FIG. 5 shows the case where the shift is performed from high gear Hi to low gear Lo as the MG2 performs the energy regeneration to decrease the vehicle speed. A request for shift from high gear Hi to low gear Lo is issued at a time t1, and the shift operation starts at a time t2. At the time of start of this shift operation, it is determined based on rotational speed margin NEmgn whether the output variations are allowed or not. Naturally, FIG. 5 shows the operation in the case where the output variations are not allowed.

The operations of the various portions from time t1 to time t3 are substantially the same as those from time t11 to time t13 in FIG. 3 so that description thereof is not repeated.

As shown in FIG. 5(b), the output torque of the MG2 starts to increase at a time t4 for raising the rotational speed of second motor generator 12 to a target rotational speed (low-gear rotational speed NLG) corresponding to low gear Lo. The output torque of the MG2 in the shift operation is controlled to match a larger one selected from between the torque request value based on the shift control and the torque request value based on the running control. Therefore, when the accelerator pedal is pressed down to increase the accelerator press-down degree at time t3 as shown in FIG. 5(a), the output torque of the MG2 increases according to the torque request value corresponding to this accelerator press-down degree.

Conversely, in the inertia phase (period α), the output torque of the MG2 is limited not to exceed first limit value TLIM1 determined according to shift progress degree PRG and second limit value TLIM2 determined according to rotational speed margin NEmgn. Thus, the range of the output torque of the MG2 is limited to a smaller one of first and second limit values TLIM1 and TLIM2. As shown in FIG. 5(b), therefore, the output torque of the MG2 matches second limit value TLIM2 during a period between times t4 and t5, and matches first limit value TLIM1 during a period between times t5 and t6.

As described above, the output torque of the MG2 is sufficiently small in the final stage of the inertia phase. Therefore, the output variations occurring at a time t6 when the torque down is executed on the MG2 are extremely small, as compared with the case in FIG. 3(a). Therefore, the torque down does not raise the rotational speed of engine 16. The slow rising of the rotational speed of engine 16 shown in FIG. 5(c) is caused by the driver's operation on the accelerator pedal, and is not caused by the influence of the torque down.

At time t6, the torque down is executed on the MG1, although not shown. The magnitude of this torque down of the MG1 can be extremely small, similarly to the torque down of the MG2. Therefore, the imbalance in torque occurring in hybrid driving apparatus 1 is extremely small.

When it is determined at a time t7 that the engaged state is attained, the output torque of the MG2 changes toward the value corresponding to the running state of the vehicle, similarly to the case in FIG. 3. In this manner, the shift control ends at a time t8, and the control is switched to the ordinary running control.

The hydraulic operations of brakes B1 and B2 are substantially the same as those in FIGS. 3(e) and 3(f), and therefore are not shown in FIG. 5.

As described above, MG2 rotational speed MRN2 can rise relatively rapidly in the initial stage of the inertia phase (period α), and further the output variations due to the torque down can be reduced in the latter stage of the inertia phase (period α). Therefore, as compared with the case where the output torque limitation of the MG2 shown in FIG. 3 is not performed, a significant delay of the shift operation can be avoided, and the rising of the rotational speed of engine 16 due to the output variations can be reduced so that such a situation can be restrained that engine 16 reaches upper limit rotational speed NEmax.

Further, the MG2 can generate a relatively large output torque in the initial stage of the inertia phase (period α). Therefore, even when the driver presses down the accelerator pedal to increase the torque request value, deterioration in response, i.e., so-called "lag feeling" can be avoided.

(Control Structure)

A control structure for implementing the above shift control will be described below.

Figure 6:
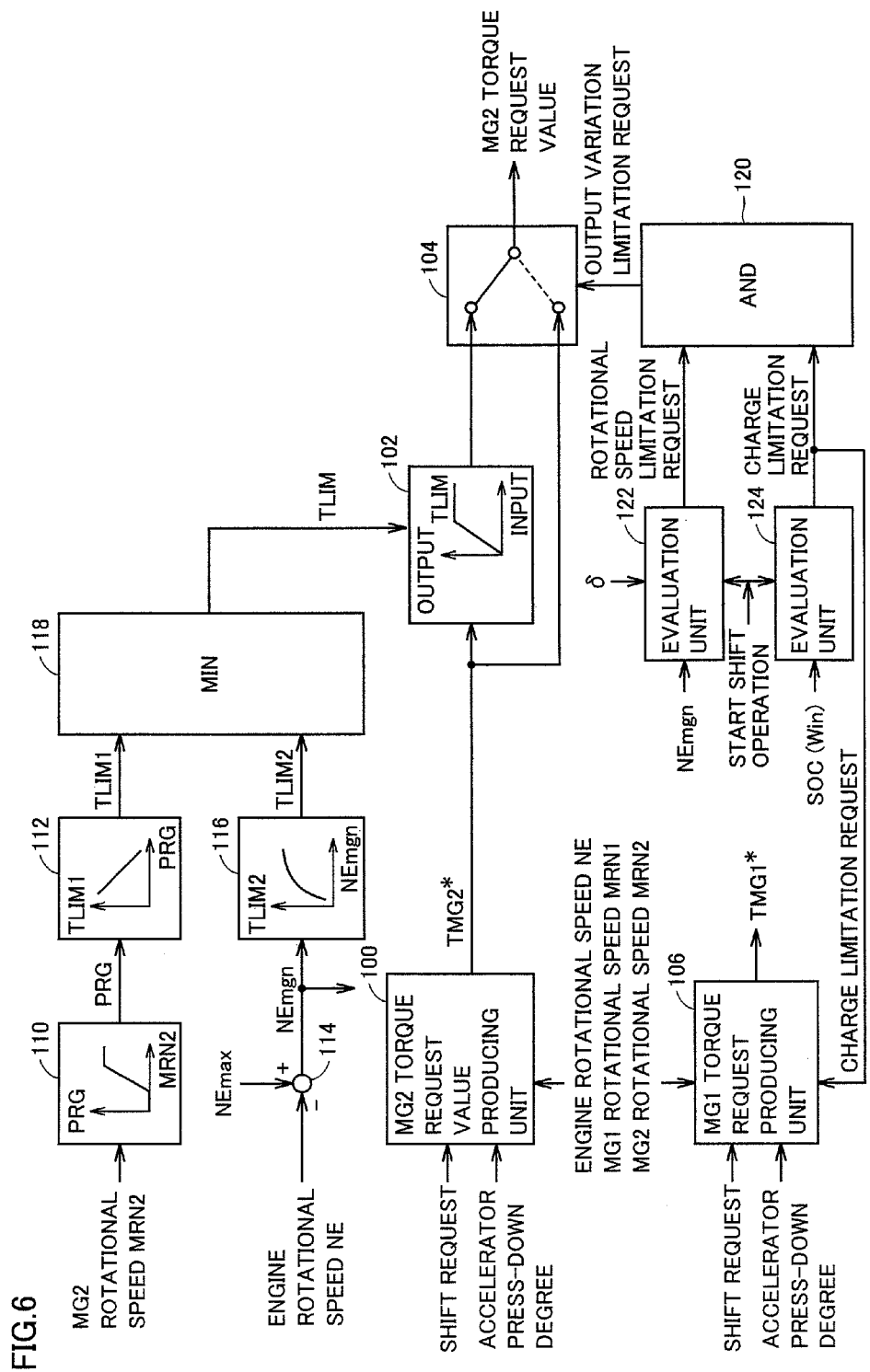
FIG. 6 is a function block diagram showing a substantial portion of a control structure according to the embodiment of the invention.

FIG. 6 is a function block diagram showing a substantial portion of the control structure according to the embodiment of the invention. The control structure shown in FIG. 6 can be implemented by electronic control units 26, 28, 30 and 34 in FIG. 1 that cooperate to execute processing corresponding to the various function blocks according to prestored programs.

Referring to FIG. 6, in the control structure according to the embodiment, a part of an MG2 torque request value TMG2* produced by an MG2 torque request value producing unit 100 is limited to a limit value TLIM or lower by a limiting unit 102, and then is provided to an upper port of a switching unit 104. The remainder is directly applied to a lower port of switching unit 104. One of the limited MG2 torque request value and MG2 torque request value TMG2* is output as the MG2 torque request value according to whether an AND unit 120 has issued an output variation limitation request or not. More specifically, MG2 torque request value TMG2* provided from MG2 torque request value producing unit 100 is limited only when AND unit 120 has issued the output variation limitation request. The MG2 is controlled according to the MG2 torque request value provided from switching unit 104.

MG2 torque request value producing unit 100 produces MG2 torque request value TMG2* based on the shift request, accelerator press-down degree, engine rotational speed NE, MG1 rotational speed MRN1 and MG2 rotational speed MRN2.

A minimum value select unit (MIN) 118 outputs, as limit value TLIM, smaller one selected from between first limit value TLIM1 produced by a shift progress degree calculating unit 110 and a first limit value characteristic storage unit 112, and a second limit value TLIM2 produced by a subtraction unit 114 and a second limit value characteristic storage unit 116.

Shift progress degree calculating unit 110 calculates shift progress degree PRG based on MG2 rotational speed MRN2. First limit value characteristic storage unit 112 determines first limit value TLIM1 with reference to a map correlating calculated shift progress degree PRG with first limit value TLIM1, or based on a predetermined mathematics.

Subtraction unit 114 calculates rotational speed margin NEmgn by subtracting present engine rotational speed NE from upper limit rotational speed NEmax of engine 16. Second limit value characteristic storage unit 116 determines second limit value TLIM2 with reference to a map correlating calculated rotational speed margin NEmgn with second limit value TLIM2, or based on a predetermined mathematics.

An evaluation unit 122 determines whether or not the output variations due to the torque down are allowed, based on rotational speed margin NEmgn calculated by subtraction unit 114. More specifically, when rotational speed margin NEmgn is smaller than a threshold δ, evaluation unit 122 determines that the output variations are not allowed, and issues a rotational speed limitation request. Threshold δ can be obtained in advance by an experiment according to response characteristics of engine 16 and the like. An evaluation unit 124 determines whether power storage device 24 is in the overcharged state or not, based on the state of charge SOC of power storage device 24 or allowed discharge power Wout.

Evaluation unit 124 issues a charge limitation request when it determines that power storage device 24 is in the overcharged state and the charge limitation is necessary. Evaluation units 122 and 124 execute the determination processing according to the start timing of the shift operation. When evaluation units 122 and 124 issue the rotational speed limitation request and charge limitation request, respectively, AND unit 120 issues an output variation limitation request to switching unit 104 to restrict the output torque of the MG2.

When evaluation unit 124 issues the charge limitation request, an MG1 torque request value producing unit 106 produces an MG1 torque request value TMG1* to execute the torque down in the MG1 along with the execution of the torque down in the MG2. The MG1 is controlled according to MG1 torque request value TMG1* provided from MG1 torque request value producing unit 106.

(Process Flow)

The processing procedures relating to the shift operation from high gear Hi to low gear Lo according to the embodiment already described can be summarized as follows.

FIG. 7 is a flowchart showing processing procedures relating to the shift operation according to the embodiment of the invention.

Referring to FIG. 7, it is determined in step S2 whether the shift request from high gear Hi to low gear Lo has been issued or not. When the shift request has not been issued (NO in step S2), the processing in step S2 will be repeated until the shift request is issued.

When the shift request is issued (YES in step S2), the process proceeds to step S4, and it is determined whether the charging of power storage device 24 is being limited or not. When the charging of power storage device 24 is being limited (YES in step S4), the process proceeds to step S6 to execute the MG2 and MG1 torque down shift processing.

When the charging of power storage device 24 is not being limited (NO in step S4), the process proceeds to step S8 to execute the MG2 torque down shift processing. The torque down shift processing in steps S6 and S8 implement the shift operation from high gear Hi to low gear Lo. The torque down shift processing in steps S6 and S8 implement the shift operation from high gear Hi to low gear Lo. When step S6 or step S8 is executed to complete the shift operation, the process returns to the initial step.

Then, description will be given on details of the MG1 and MG2 torque down shift processing in step S6 described above.

FIG. 8 is a flowchart showing details of the MG2 and MG1 torque down shift processing.

Referring to FIG. 8, the processing is first performed in step S100 to calculate rotational speed margin NEmgn with respect to upper limit rotational speed NEmax of engine rotational speed NE. Then, the process proceeds to step S102 to determine whether rotational speed margin NEmgn is smaller than threshold δ or not. When rotational speed margin NEmgn is smaller than threshold δ (YES in step S102), the process proceeds to step S104, and it is determined that the output variations due to the torque down are not allowed. The processing in and after step S104 will be described below with reference to FIG. 5.

After the execution in step S104, the process proceeds to step S106 to produce MG2 torque request value TMG2* for raising MG2 rotational speed MRN2 to low-gear rotational speed NLG corresponding to low gear Lo. Then, the process proceeds to step S108 to calculate first limit value TLIM1 corresponding to shift progress degree PRG. Subsequently, the process proceeds to step S110 to calculate second limit value TLIM2 corresponding to rotational speed margin NEmgn. Further, the process proceeds to step S112, in which produced MG2 torque request value TMG2* is limited to exceed neither first limit value TLIM1 nor second limit value TLIM2. Then, the output torque of the MG2 is controlled according to the MG2 torque request value thus limited (times t3 to t6 in FIG. 5(b)).

The process proceeds to step S116 to determine whether MG2 rotational speed MRN2 has exceeded low-gear rotational speed NLG or not. When MG2 rotational speed MRN2 has not exceeded low-gear rotational speed NLG (NO in step S116), the process returns to step S106. Thus, the processing in steps S106 to S116 is repeated until MG2 rotational speed MRN2 exceeds low-gear rotational speed NLG.

When MG2 rotational speed MRN2 has exceeded low-gear rotational speed NLG (YES in step S116), the process proceeds to step S118 to execute the MG2 torque down (at time t6 in FIG. 5(b)). According to the execution of this MG2 torque down, the MG1 torque down is executed in next step S120.

After the torque down is executed in the MG2 and MG1, the process proceeds to step S122, and it is determined whether the engaged state is attained on the low gear Lo side or not. When the engaged state is not attained (NO in step S122), the determination processing will be repeated until the engaged state is attained (times t6 to t7 in FIG. 5).

When the engaged state is already attained (YES in step S122), the output torques of the MG2 and MG1 are restored to the values corresponding to the running control, respectively (times t7 to t8 in FIG. 5), and then the process returns to corresponding step S6 shown in FIG. 7.

When rotational speed margin NEmgn is not smaller than threshold δ (NO in step S102), the process proceeds to step S124, and it is determined that the output variations due to the torque down are allowed. The processing in and after step S124 will be described below with reference to FIG. 3.

After execution of step S124, the process proceeds to step S126 to produce MG2 torque request value TMG2* for raising MG2 rotational speed MRN2 to low-gear rotational speed NLG corresponding to low gear Lo. The process proceeds to step S128, and the output torque of the MG2 is controlled according to MG2 torque request value TMG2* thus produced (times t13 to t14 in FIG. 3(a)).

The process proceeds to step S130 to determine whether MG2 rotational speed MRN2 has exceeded low-gear rotational speed NLG or not. When MG2 rotational speed MRN2 has not exceeded low-gear rotational speed NLG (NO in step S130), the process returns to step S126. Thus, the processing in steps S126 to S130 is repeated until MG2 rotational speed MRN2 exceeds low-gear rotational speed NLG.

When MG2 rotational speed MRN2 has exceeded low-gear rotational speed NLG (YES in step S130), the process proceeds to step S118, and the processing similar to that in steps S118 to S122 already described is executed.

The "MG2 torque down shift processing" executed in step S8 in FIG. 7 is substantially the same as the series of processing in steps S126 to S130 and S118 except for the execution of the MG1 torque down in step S120 in FIG. 8, and therefore description thereof is not repeated.

The correlation between the embodiment of the invention and the present invention is as follows. Engine 16 corresponds to the "power source", first motor generator (MG1) 18 corresponds to the "power generator", planetary gear mechanism 20 corresponds the "output distribution mechanism", transmission mechanism 14 corresponds the "transmission mechanism" and second motor generator (MG2) 12 corresponds to the "electric motor". Further, MG2 torque request value producing unit 100 corresponds to the "electric motor control unit", MG1 torque request value producing unit 106 corresponds to the "power generator control unit", evaluation units 122 and 124 as well as AND unit 120 correspond to the "determination unit", and limiting unit 102 and switching unit 104 correspond to the "limiting unit".

In the embodiment, the output torque of the MG2 is reduced in advance in the inertia phase in the case where the output variations caused by execution of the torque down of the MG2 and MG1 are not allowed and, for example, when the charging of power storage device 24 is being limited and engine 16 is operating in a range near the allowed upper limit rotational speed. Thereby, it is possible to reduce the quantity of output torque variations of the MG2 caused when the torque down of the MG2 is executed, and it is also possible to reduce the quantity of torque down of the MG1 executed according to the torque down of the MG2. Therefore, it is possible to reduce the output variations (imbalance in torque) caused when the torque down is executed in the MG2 and MG1, and the rising of rotational speed of engine 16 can be restrained. Further, it is possible to avoid the generation of the shift shock because the brake can be engaged in the state where the torque down has been performed.

Accordingly, even when the charging of power storage device 24 is being limited and engine 16 is operating in the range near the allowed upper limit rotational speed, the shift operation from high gear Hi to low gear Lo can be performed while reliably avoiding the shift shock.

In the embodiment, since first limit value TLIM1 determined according to shift progress degree PRG is used, a relatively large output torque of the MG2 can be ensured in the initial stage of the inertia phase, i.e., when it is necessary to raise MG2 rotational speed MRN2 to a large extent and an appropriate time margin is present before execution of the torque down. Thereby, it is possible to reduce the time required for the shift operation and to improve or maintain the response with respect to the driver's request.

Also, the embodiment uses second limit value TLIM2 determined according to rotational speed margin NEmgn with respect to upper limit rotational speed NEmax of engine 16, and limits the output torque of the MG2 to decrease with decrease in rotational speed margin NEmgn. Thereby, the rotational speed of engine 16 can be reliably ensured within upper limit rotational speed NEmax.

The embodiment has been exemplified in connection with the transmission mechanism that can selectively provide two gear ratios. However, a transmission mechanism that can selectively provide three of more gear ratios may be employed. Even when this transmission mechanism is used, similar control can be executed in the shift operation from any gear ratio to a larger gear ratio.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A hybrid driving apparatus comprising:
  a power generator electrically connected to a power storage device;
  an output distribution mechanism for distributing a part of an output of a power source to said power generator and for distributing the remainder of said output to a rotation output shaft;
  a transmission mechanism for selectively providing a plurality of gear ratios by a combination of engaging and releasing of a plurality of frictional engagement devices;
  an electric motor electrically connected to said power storage device and mechanically connected to said rotation output shaft via said transmission mechanism;
  an electric motor control unit for controlling an output of said electric motor, said electric motor control unit executing, in a shift operation of changing a first gear ratio to a second gear ratio larger than said first gear ratio, a first control operation for controlling a torque of said electric motor to raise a rotational speed of said electric motor to a target value corresponding to said second gear ratio, and a second control operation subsequent to said first control operation for reducing the torque of said electric motor to or below a predetermined value;
  a power generator control unit for restraining increase in quantity of the power generated by said power generator in accordance with execution of said second control operation by said electric motor control unit during limitation of charging of said power storage device;
  a determination unit for determining whether or not changes in output of said electric motor caused by operation switching from said first control operation to said second control operation is allowed, during limitation of charging of said power storage device and prior to said electric motor control unit executes said second control operation; and
  a limiting unit for limiting the torque of said electric motor in said first control operation to be smaller than that attained when said changes in output are allowed in said first control operation, if said determination unit determines that said changes in output are not allowed.

2. The hybrid driving apparatus according to claim 1, wherein
  said determination unit determines that the changes in output of said electric motor is not allowed, if a rotational speed margin with respect to an allowed upper limit rotational speed of said power source is smaller than a predetermined value.

3. The hybrid driving apparatus according to claim 1, wherein
  said limiting unit reduces the torque of said electric motor according to progress of said first control operation.

4. The hybrid driving apparatus according to claim 1, wherein
  said limiting unit determines a first limit value according to a degree of attaining a present rotational speed of the electric motor with respect to the rotational speed corresponding to said second gear ratio, and limits the torque of said electric motor not to exceed said first limit value.

5. The hybrid driving apparatus according to claim 1, wherein
  said limiting unit limits the output of said electric motor not to exceed a second limit value determined depending on the rotational speed margin with respect to the allowed upper limit rotational speed of said power source.

6. The hybrid driving apparatus according to claim 1, wherein
  said power source is formed of an engine.

7. A vehicle comprising a hybrid driving apparatus, wherein
  said hybrid driving apparatus includes:
  a power generator electrically connected to a power storage device;
  an output distribution mechanism for distributing a part of an output of a power source to said power generator and for distributing the remainder of said output to a rotation output shaft;
  a transmission mechanism for selectively providing a plurality of gear ratios by a combination of engaging and releasing of a plurality of frictional engagement devices;
  an electric motor electrically connected to said power storage device and mechanically connected to said rotation output shaft via said transmission mechanism;
  an electric motor control unit for controlling an output of said electric motor, said electric motor control unit executing, in a shift operation of changing a first gear ratio to a second gear ratio larger than said first gear ratio, a first control operation for controlling a torque of said electric motor to raise a rotational speed of said electric motor to a target value corresponding to said second gear ratio, and a second control operation subsequent to said first control operation for reducing the torque of said electric motor to or below a predetermined value;
  a power generator control unit for restraining increase in quantity of the power generated by said power generator in accordance with execution of said second control operation by said electric motor control unit during limitation of charging of said power storage device;
  a determination unit for determining whether or not changes in output of said electric motor caused by operation switching from said first control operation to said second control operation is allowed, during limitation of charging of said power storage device and prior to said electric motor control unit executes said second control operation; and
  a limiting unit limiting the torque of said electric motor in said first control operation to be smaller than that attained when said changes in output are allowed in said first control operation, if said determination unit determines that said changes in output are not allowed.

8. A control method of a hybrid driving apparatus, wherein said hybrid driving apparatus includes:

a power generator electrically connected to a power storage device, an output distribution mechanism for distributing a part of an output of a power source to said power generator and for distributing the remainder of said output to a rotation output shaft, a transmission mechanism for selectively providing a plurality of gear ratios by a combination of engaging and releasing of a plurality of frictional engagement devices, and an electric motor electrically connected to said power storage device and mechanically connected to said rotation output shaft via said transmission mechanism;

said control method includes:

a first control step of controlling a torque of said electric motor to raise a rotational speed of said electric motor to a target value corresponding to said second gear ratio in a shift operation of changing a first gear ratio to a second gear ratio larger than said first gear ratio, a second control step of reducing the torque of said electric motor to or below a predetermined value, subsequently to said first control operation, and a third control step of restraining increase in quantity of the power generated by said power generator in accordance with execution of said second control step during limitation of charging of said power storage device; and said first control step includes:

a step of determining whether or not changes in output of said electric motor caused by execution processing from said first control step to said second control step is allowed, during limitation of charging of said power storage device, and a step of limiting the torque of said electric motor to be smaller than that attained when said changes in output are allowed, if it is determined in said determination step that said changes in output are not allowed.

* * * * *